(12) United States Patent
Schweitzer et al.

(10) Patent No.: US 7,065,571 B2
(45) Date of Patent: *Jun. 20, 2006

(54) SYSTEM, METHOD AND COMPUTER PROGRAM PRODUCT FOR POLICY-BASED BILLING IN A NETWORK ARCHITECTURE

(75) Inventors: Limor Schweitzer, Santa Clara, CA (US); Tal Givoly, Curpertino, CA (US); Damian Black, San Francisco, CA (US); Ori Kushnir, New York, NY (US)

(73) Assignee: Amdocs (Israel) Ltd., Ra'anana (IL)

( * ) Notice: Subject to any disclaimer, the term of this patent is extended or adjusted under 35 U.S.C. 154(b) by 147 days.

This patent is subject to a terminal disclaimer.

(21) Appl. No.: 09/935,131

(22) Filed: Aug. 21, 2001

(65) Prior Publication Data

US 2002/0013849 A1    Jan. 31, 2002

Related U.S. Application Data

(63) Continuation of application No. 09/552,818, filed on Apr. 20, 2000.

(60) Provisional application No. 60/141,351, filed on Jun. 28, 1999.

(51) Int. Cl.
    *G06F 15/173* (2006.01)
(52) U.S. Cl. .................... 709/223; 709/227
(58) Field of Classification Search ........... 709/223, 709/224, 225, 226, 201, 205, 227, 228; 370/474, 370/473, 469, 465
    See application file for complete search history.

(56) References Cited

U.S. PATENT DOCUMENTS

| | | | |
|---|---|---|---|
| 5,101,402 A * | 3/1992 | Chiu et al. ............... 709/224 |
| 5,563,879 A * | 10/1996 | Sanders et al. ............... 370/60 |
| 5,648,965 A * | 7/1997 | Thandani et al. ........... 370/241 |
| 5,701,152 A | 12/1997 | Chen ............................. 348/3 |
| 5,745,556 A * | 4/1998 | Ronen .................... 379/114.01 |
| 5,787,253 A * | 7/1998 | McCreery et al. .......... 709/201 |
| 5,794,221 A | 8/1998 | Egendorf ...................... 705/40 |
| 5,845,267 A * | 12/1998 | Ronen ........................ 709/246 |
| 5,905,736 A * | 5/1999 | Ronen et al. ................ 370/352 |
| 6,047,051 A | 4/2000 | Ginzboorg et al. ......... 379/130 |
| 6,108,700 A * | 8/2000 | Maccabee et al. .......... 709/224 |
| 6,199,054 B1 * | 3/2001 | Khan et al. ................... 705/52 |
| 6,286,030 B1 * | 9/2001 | Wenig et al. ............... 709/203 |

(Continued)

FOREIGN PATENT DOCUMENTS

EP          1054529 A2       11/2000

(Continued)

OTHER PUBLICATIONS

Roberts, B.; "Rich Data About Customer Usage (Narus[1] semantic traffic analysis)"; Internet World, v5, n10, p. 27; Mar. 1999.*

(Continued)

*Primary Examiner*—Marc D. Thompson
(74) *Attorney, Agent, or Firm*—Zilka-Kotab, PC

(57) ABSTRACT

A system, method and computer program product are provided for policy-based billing for a network session. Initially, a plurality of packets is received by a plurality of analyzers. Thereafter, the packets are aggregated. Next, the plurality of packets is analyzed to identify a plurality of flows and an session associated with the flows. At least one application associated with the session is also identified. The session is then reconstructed utilizing the identified application. A user associated with the session is then identified along with a policy. The user is then billed for the session in accordance with the policy.

31 Claims, 7 Drawing Sheets

U.S. PATENT DOCUMENTS 6,404,870 B1 * 6/2002 Kia et al. .............. 379/114.15
6,608,814 B1 * 8/2003 Libman et al. ............. 370/230
6,615,262 B1 * 9/2003 Schweitzer et al. ......... 709/224

FOREIGN PATENT DOCUMENTS

JP            08039828      9/1997

OTHER PUBLICATIONS

Busniess Wire, "Narus and Portal Join to Provide Internet Service Providers Full Customer Management and Billing Solutions"; Mar. 1999.*

Reardon, M.; "Serving Up QoS End to End", Data Communications; pp. 25-27, Nov. 1998.*

"Narus Intelligence", service brochure, digitally dated PDF file, Feb. 1999.*

Office Action mailed Aug. 23, 2004, from corresponding European Application No. 00944892.9-1244.

Frank, Matthias et al., "Practical Experiences with a Transport Layer Extension for End-to-End Bandwidth Regulation", © 1997 IEEE, pp. 337-346.

Office Action mailed Nov. 3, 2004, in U.S. Appl. No. 09/552,818, filed Apr. 20, 2000.

* cited by examiner

SYSTEM, METHOD AND COMPUTER PROGRAM PRODUCT FOR POLICY-BASED BILLING IN A NETWORK ARCHITECTURE

RELATED APPLICATIONS

This is a continuation application of copending prior application Ser. No. 09/552,818 filed on Apr. 20, 2000, the disclosure of which is incorporated herein by reference.

This application relates to, claims the benefit of priority of, and incorporates by reference, U.S. Provisional Patent Application No. 60/141,351, entitled "Method and Apparatus for Session Reconstruction" filed Jun. 28, 1999, having inventor Limor Schweitzer.

This application relates to the following group of applications. Each application in the group relates to, and incorporates by reference, each other application in the group. The invention of each application is assigned to the assignee of this invention. The group of applications includes the following.

| Title | First Inventor | Filing Date | Serial Number | Attorney Docket Number |
|---|---|---|---|---|
| Method and Apparatus for Session Reconstruction | Limor Schweitzer | Apr. 20, 2000 | 09/552,818 | 19623-707 |
| Method and Apparatus for Distributed Session Reconstruction | Limor Schweitzer | Apr. 20, 2000 | 09/553,261 | 19623-708 |

BACKGROUND OF THE INVENTION

1. Field of the Invention

This invention relates to the field of network management. In particular, the invention relates to session reconstruction in a network environment.

2. Description of the Related Art

The Internet protocol (IP) that is widely used on the Internet does not provide a committed quality of service. Several protocols have been developed to compliment standard implementations of IP to provide varying degrees of support for committed quality of service networks.

One set of extensions is the Differentiated Services (diffserv) specified by RFC 2474 and RFC 2475, that provides for using portions of the IP header information to store information about the types of service (TOS). Another approach is the resource reservation protocol (RSVP) specified by RFCs 2205–2210. In some instances, where appropriate, the two can be used together to provide a committed quality of service over an IP network.

The provision of a committed quality of service network is distinct from the monitoring the network and billing for usage of the network. Existing network monitoring processes such as RMON2, and RMON, specified by RFC 2074 and RFC 2021 are designed to report statistics based on information available in the packet headers, e.g. source and destination address. With RMON2, this can be broken down on a per port basis. The granularity of the reports depends on the sampling of the RMON trace. The returned statistics are basic measures of number of bytes and number of packets. Netflow(TM), from Cisco Corporation, San Jose, Calif., adds to these abilities by providing measures based on the terms of service, e.g. diffserv style flag, and the IP port used. Similarly, Firewall-1(TM) and Floodgate-1(TM) from Check Point Software Technologies, Ramat Gan, Israel, offers a similar set of features to Netflow(TM). Both Netflow(TM) and Firewall-1(TM)/Floodgate-1(TM) focus on reporting per flow statistics.

Previous techniques do not support quality of service related evaluation of network usage. Previous systems do not allow for reconstructing sessions, where each session may be comprised of multiple flows. Previous systems do not provide for application specific event monitoring. Previous systems to not handle large volumes of data received over different network devices well. Accordingly, what is needed is a session reconstruction system that supports measuring quality of service, reconstruction of sessions that include multiple flows, application specific event monitoring within flows, and distributed session reconstruction.

SUMMARY OF THE INVENTION

A system, method and computer program product are provided for policy-based billing for a network session. Initially, a plurality of packets is received by a plurality of analyzers. Thereafter, the packets are aggregated. Next, the plurality of packets is analyzed to identify a plurality of flows and an session associated with the flows. At least one application associated with the session is also identified. The session is then reconstructed utilizing the identified application. A user associated with the session is then identified along with a policy. The user is then billed for the session in accordance with the policy.

DETAILED DESCRIPTION

A. System Overview

1. Terminology

Figure 1:
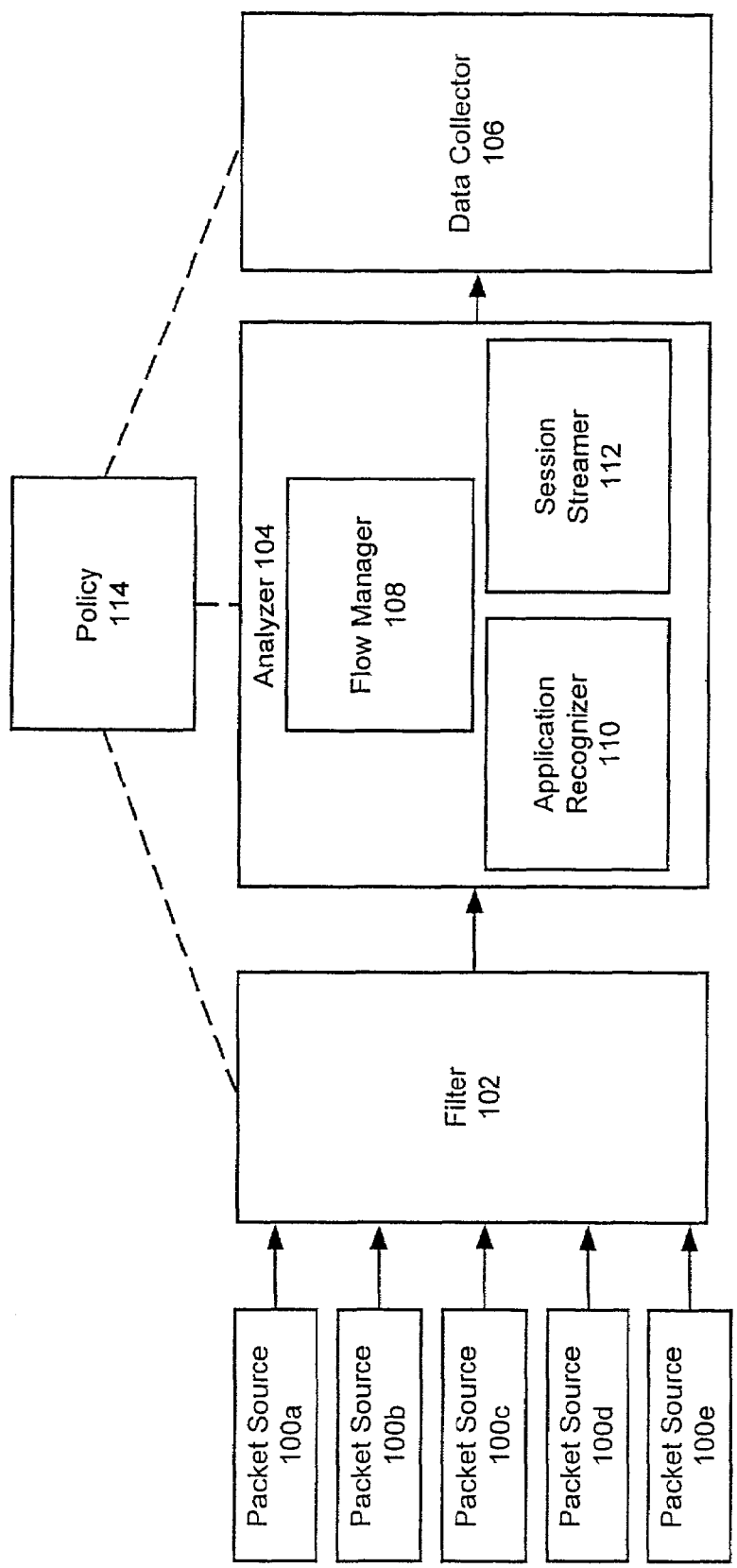
FIG. 1 illustrates a system including one embodiment of the invention.

The Internet protocol (IP) is a network layer protocol. The transmission control protocol (TCP) and the user datagram protocol (UDP) are two transport protocols used over IP networks. These transport mechanisms are in turn used by application layer protocols such as telnet, file transport protocol (ftp), hypertext transfer protocol (http), domain name service (DNS), simple mail transport protocol (SMTP), RealAudio(TM), NetMeeting(TM), etc.

One common encapsulation of IP packets is within IEEE 802.3 Ethernet frames. In such an embodiment, the payload, or data, portion of the packet includes an IP datagram comprising headers and a text part. The text part in turn includes the transport layer protocol such as TCP or UDP. The transport layer portion has an additional transport layer specific header and then a data portion. This data portion is in turn comprised of data specific to the application layer protocol.

Thus, a given packet sent over an IP network may have several sets of addresses, including: a set of medium access (MAC) layer address; a set of network layer address; and a set of transport layer address. Additionally, there may be application specific addresses.

Most routing and flow detection/management software is limited to looking at the header addresses: MAC addresses, IP addresses, and TCP/UDP ports. TCP/UDP ports can be used for multiple purposes; therefore, unless the application data itself is examined, it may not be possible to provide accurate application based reporting. For example, port 80 is typically used for hypertext transfer protocol (HTTP) access. However, there is nothing to prevent a program from using that port for other data, e.g. online games. In fact, switching a protocol like RealAudio(TM), which sometimes exhibits poor behavior due to network congestion, to a port used by a well-known service such as DNS can provide huge speed improvements for an end user.

Comparison of TCP/IP Model with OSI Model

This specification uses terminology from the TCP/IP Model to describe networks. However, a brief description of the OSI Model is appropriate. The OSI model, or Open Systems Interconnection Reference Model, is a seven-layer model comprising the following layers: physical (1); data link (2); network (3); transport (4); session (5); presentation (6); and application (7).

The TCP/IP Model terminology used in this specification can be mapped onto the OSI Model as follows: host-to-network (1/2); Internet Protocol (IP) (3); Transmission Control Protocol (TCP) and/or User Datagram Protocol (UDP) (4); and application layer (7). The TCP/IP model does not include an analogous set of abstractions for layers five and six of the OSI Model. The application layer in the TCP/IP model is comprised of higher-level protocols such as file transfer protocol (FTP), hypertext transfer protocol (HTTP), etc.

Some embodiments of the invention may be adapted to work with OSI Model networks and may include appropriate detectors for operating at the presentation and/or session layers.

2. Application Identification and Sessions

Because of the ability of applications to use TCP and UDP ports arbitrarily, it is not adequate to rely on header information to determine what application a packet is being used for. For example, RealAudio(TM) packets could be sent over the ports normally used for DNS.

Limiting the review of packets to just headers would not allow applications that use multiple TCP/UDP flows for a single session to be tracked. Common examples of such applications include H.323 calls and ftp sessions. Thus, a voice over IP program can establish multiple TCP/UDP flows for a single call. Similarly, each file transferred during an ftp session can use a distinct TCP/UDP flow.

Another limitation of scanning headers alone occurs in committed quality of service networks where it is important to be able to monitor and charge for usage based on relevant events for an application.

Therefore, the term "session" refers to a group of related flows within a definite time bound relating to an end user experience, each of the flows may share one or more common packet header elements. Thus, for the ftp application, a session is comprised of the flows containing the commands as well as of the flows used for transferring files. For a voice over IP call, the control flows as well as all of the flows containing voice and/or video data would be part of a single session.

Additionally, sessions can hierarchically be comprised of other sessions. For example, the process of accessing a single web page may be comprised of multiple HTTP sessions. Thus a "WWW session" might be considered to comprise all web activity by a user in a definite time bound, e.g. times out after X minutes without further activity. A WWW session could be comprised of page sessions for each retrieved page. The page sessions in turn could be comprised of one or more HTTP sessions, e.g. one or more flows for retrieving an object using the HTTP protocol.

Continuing the example of the voice over IP call, a provider might provide guarantees about average latency to customers. For example, the provider might promise that the average latency would not exceed Z ms. If the entire voice over IP call is treated as a single session, the latency can be measured and the appropriate compensation can be given if the latency guarantee was not met. Further, because application specific events can be monitored, addition and removal of call legs can be tracked and appropriate service detail records generated. Also, different application protocols may have different usage billing requirements. For example, voice over IP calls for a prepaid calling card must be checked every minute to ensure that a user does not exceed the minutes available to them.

3. System Setup

FIG. 1 illustrates a system including one embodiment of the invention. This could be used in conjunction with a corporate Intranet to provide policy based session management and monitoring. A provider of voice could use this over IP telephony to meter and monitor usage and provide a committed quality of service.

This paragraph lists the elements of FIG. 1 and describes their interconnections. FIG. 1 includes the packet sources 100*a–e,* a filter 102, an analyzer 104, a data collector 106, a policy 114. The analyzer 104 includes a flow manager 108, an application recognizer 110, and a session streamer 112. The packet sources 100*a–e* are coupled in communication with the filter 102. The filter 102 is coupled in communication with the analyzer 104. The analyzer 104 is coupled in communication with the data collector 106. The filter 102, the analyzer 104, and the data collector 106 are capable of accessing the policy 114.

The following describes the uses of the elements of FIG. 1. The packet sources 100*a–e* could be network connections, local computers, network computers, the Internet, and/or some other type of packet source. The packet sources 100*a–e* are sources of packets such as IP packets, IPX packets, and/or some other type of packets.

In some embodiments the filter 102 is provided to filter out packets. In other embodiments, no filter 102 is used. The filter 102 can be set to remove local traffic from further analysis, e.g. packets not leaving the corporate Intranet, or packets not travelling over a particular backbone. Additionally, if multiple analyzers like the analyzer 104 are being used, then multiple filters like the filter 102 can be used to segment the analysis. For example, all voice over IP calls might be filtered out by one filter but be the only thing passed through by another. This allows for tremendous flexibility in providing distributed analysis and meaningful analysis. In some embodiments, a standard packet capture (pcap) language is used to define the filter, e.g. "tcp and port 80 or dst net 192.168.0.0 mask 255.255.0.0", etc.

Only those packets that meet the tests of the filter 102 are passed to the analyzer 104. In some embodiments, the filter 102 and the analyzer 104 are hosted on separate computers. For example, the filter 102 might have two Ethernet interfaces, one for receiving packets from the packet sources 100a–e and the other for sending matching packets to the analyzer 104.

Packets are analyzed by the analyzer 104 to be assigned to flows and then to sessions. The analyzer 104 can gather statistics about flows and sessions for use by the data collector 106. Each of the components of the analyzer 104 can be performed on a single computer and/or multiple computers to support distributed processing.

The policy 114 controls how the system operates. For example, the policy might specify the ability of certain users or groups to perform certain tasks. The policy might control how much bandwidth certain users or groups get. The policy might control how users or groups are billed for usage. The policy may also control how different application events are treated, e.g. for voice over IP request minute by minute service detail records, etc. Other options include controlling when sessions, flows and/or packets are dropped, the contents of output from the data collector 106, what application specific headers and statistics are being collected, and/or other options.

For example, for HTTP, the time from click to first reply and time from click till last TCP thread finished might be recorded as well as the base uniform resource indicator (URI). In some embodiments, the policy can include a series of pcap language style expressions together with output selectors as shown by the example in Table 1.

TABLE 1

| Expression | Output Period | Action | . . . | Out Latency | In Latency |
|---|---|---|---|---|---|
| 192.168.100/24 AND (TIME < 14:00:00 OR TIME > 22:00:00) | Period = 60 | Bill | . . . | Y | Y |
| PORT < 2000 AND UDP | Period = 0 | Log | . . . | Y | N |
| . . . | | | | | |

This allows a set of actions to be flexibly defined. A separate table could provide the information for the filter 102. The policy 114 can also contain user and group based restrictions and evaluations.

B. Handling Unrecognized Flows

Figure 2:
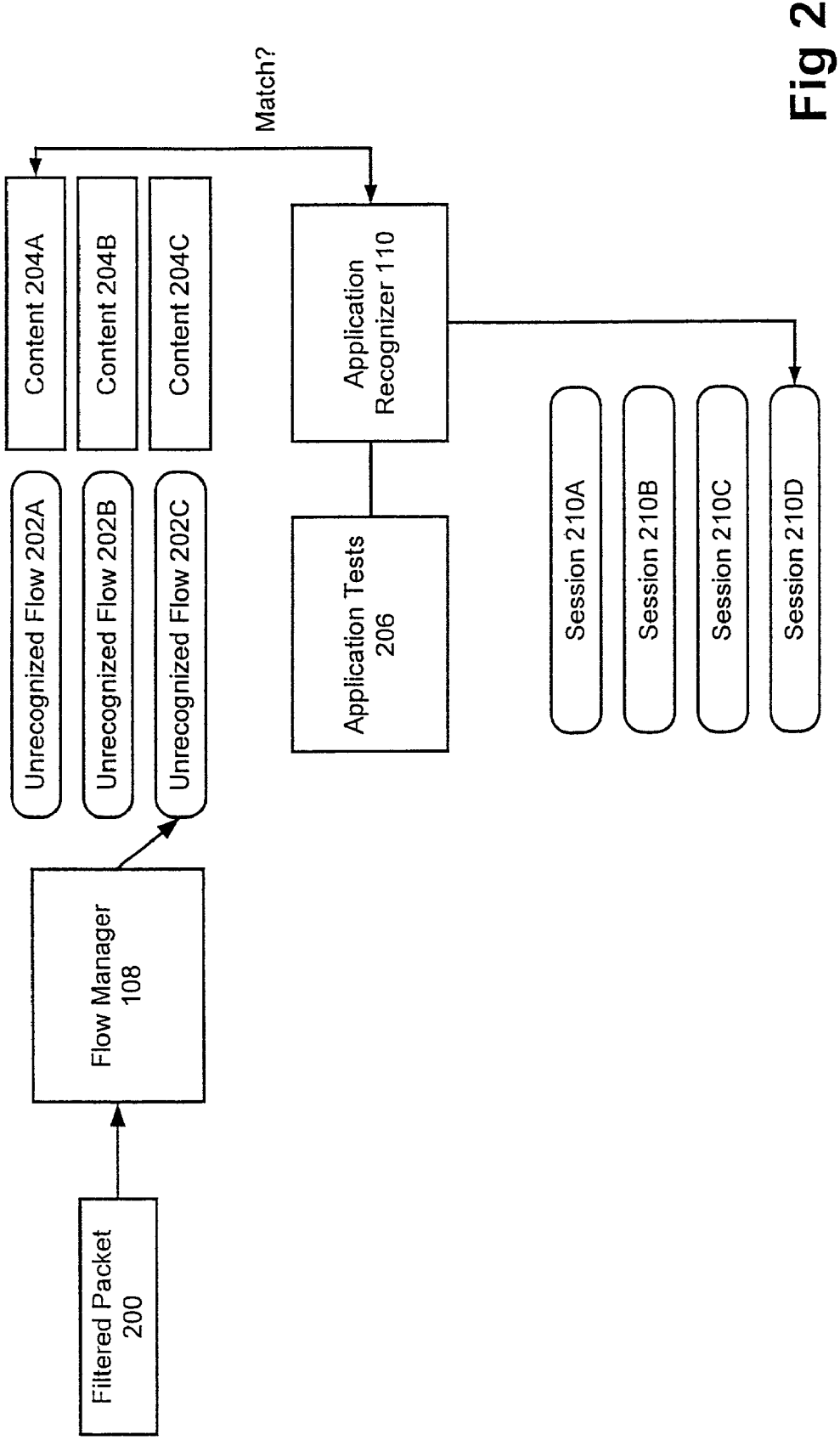
FIG. 2 illustrates the handling of packets that are not part of a recognized flow.

FIG. 2 illustrates the handling of packets that are not part of a recognized flow. As users begin new activities, each flow is initially not recognized. For example, starting to access a web page. FIG. 2 shows how unrecognized flows are handled according to some embodiments of the invention.

In this example, a filtered packet 200 is passed to the flow manager 108 within the analyzer 104 by the filter 102. Because the flow manager 108 does not recognize the packet as belonging to an existing flow, it is added to a queue of unrecognized flows 202A–B as unrecognized flow 202C and the packets are placed in content 204C. If additional packets for the flow arrive before the flow is recognized, they can be associated with the flow by adding the packet to the respective content 204A–C.

The application recognizer 110 examines each of the flows in the queue and identifies whether the content of the flow matches a known application. This is based on the packet content itself. The application recognizer 110 can use the application tests 206 to perform matching.

In some embodiments, the application tests 206 include tests for CuSeeMe, http, ftp, RealAudio(TM), post office protocol version 3 (POP3), SMTP, NetMeeting(TM), Quicktime(TM), H.323 calls, telnet, and/or other applications. The application tests for a particular application protocol describe how to identify a particular application protocol from the data content of packets.

In this example, three sessions 210A–C have already been identified. If the application recognizer finds a matching application, the unrecognized flow 202A will be assigned to a new session, session 210D. The session streamer 112 is used to alert the flow manager 108 to new flows that are part of an existing session in some embodiments of the invention. Therefore, unrecognized flows will be assigned to new sessions while new flows for an existing session will be treated as recognized flows.

Some flows may not be recognized as belonging to any application. For example, if a new protocol is developed for streaming media, then none of the application tests 206 may be able to recognize the flow. In that case, some embodiments of the invention treat the unrecognized flow as a self-contained session after more than two kilobytes (KB) have been sent or if a predetermined amount of time passes without additional packets.

Because the application tests 206 are modular, additional tests can be added, modified, and/or removed easily. The tests can, if appropriately designed, detect specific application protocols, e.g. RealAudio(TM) type Y encoding, etc.

C. Handling Existing Flows

Figure 3:
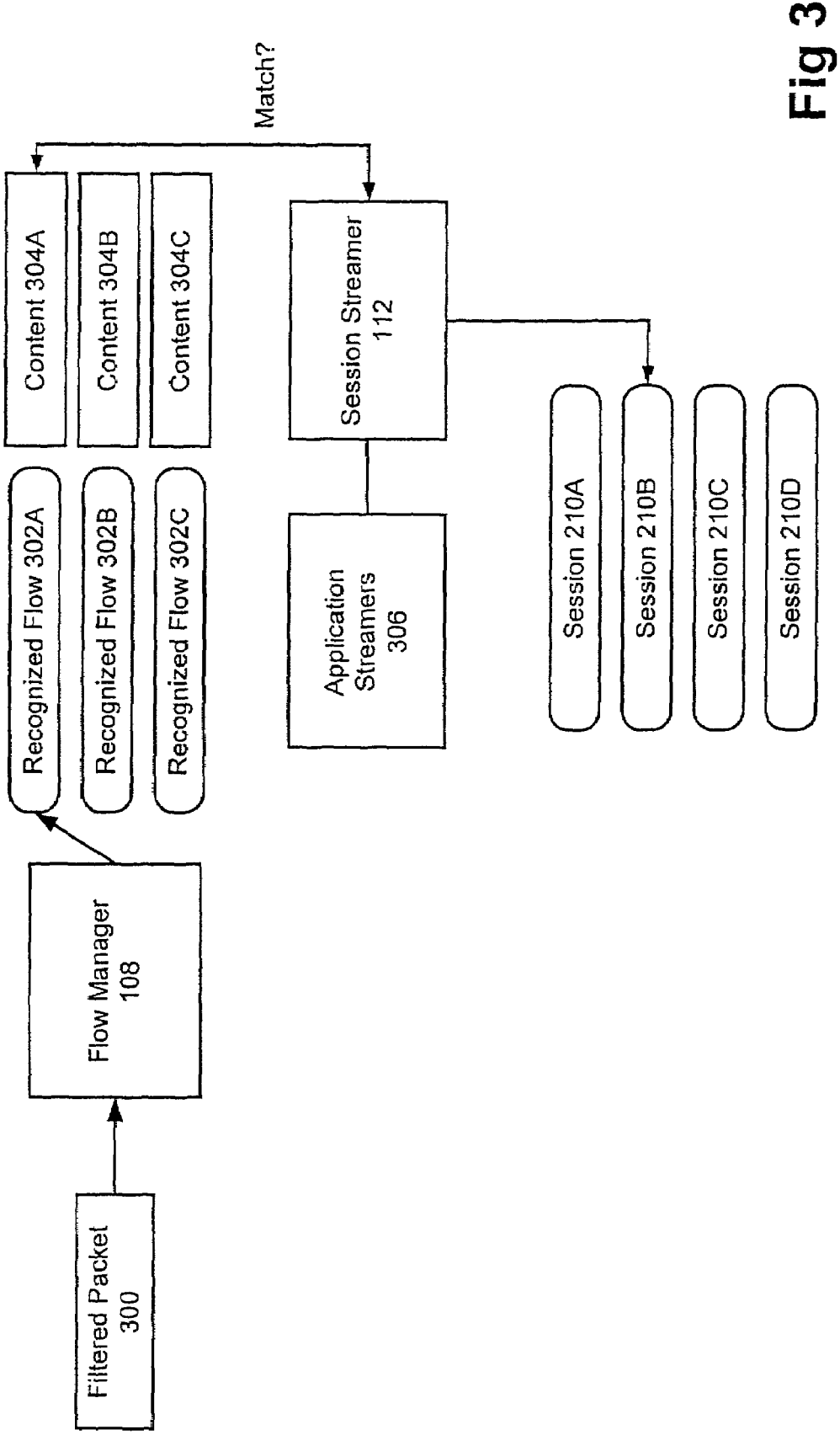
FIG. 3 illustrates the handling of packets that are part of a recognized flow.

FIG. 3 illustrates the handling of packets that are part of a recognized flow once a session is underway (For example, ongoing packets in a voice over IP call). Additionally, the session streamer 112 can provide information to the flow manager 108 to allow new flows for an existing session to be recognized without the application recognizer 110 being used. FIG. 3 shows how recognized flows are handled according to some embodiments of the invention.

Filtered packets 300 flow into the flow manager 108. Because the packet belongs to a recognized flow, e.g. the recognized flow 3202A, it is associated with the respective content, e.g. the content 304A.

The session streamer 112 uses the application streamers 306 to detect application specific events, e.g. add leg, etc., and assign the content to respective sessions. The application streamers 306 are similar to the application tests 206. However, the application streamers 306 contain tests for matching additional packets from the same application session.

The session streamer 112 in conjunction with the application streamers 306 may also be able to detect the request for additional channels or ports and provide that information to the flow manager 108. Thus, new flows for an existing session will not be treated as unrecognized flows, but rather will be recognized and handled by the session streamer 112. For example, the application streamers 306 might include NetMeeting(TM) specific streamers for detecting add leg and drop leg events and providing the addressing information to the flow manager 108. The policy 114 can assign significance and actions relative to certain application events identified by the application streamers 306.

The session streamer 112 assigns the packets from the flows to the respective sessions based on the results of the application streamers 306. Here, the recognized flow 302A and the content 304A is matched with the session 210B.

D. Statistics Generation

Figure 4:
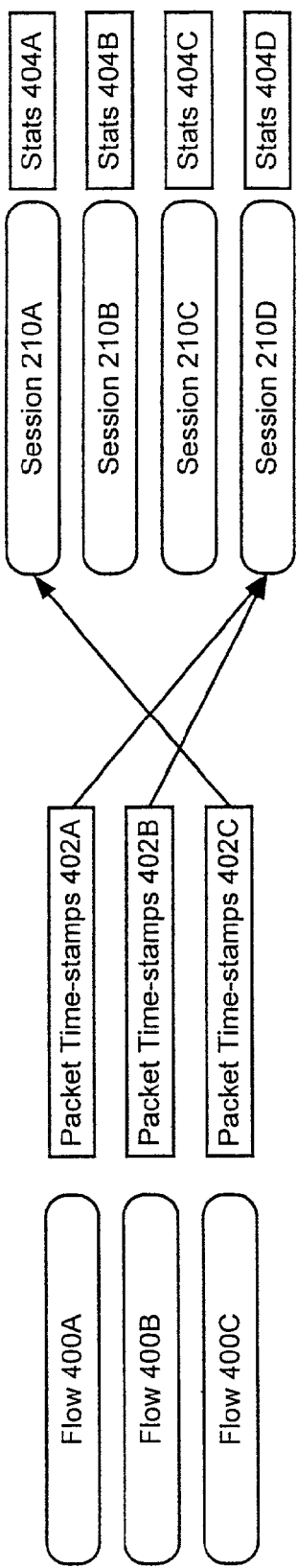
FIG. 4 illustrates the relationship between information about a flow and information about a session.

FIG. 4 illustrates the relationship between information about a flow and information about a session. FIG. 4 includes three flows 400A–C with respective packet time-stamps 402A–C. Each flow 400A–C is associated with a corresponding session 210A–D. Here, the flows 400A–B are both associated with session 210D while flow 400C is associated with session 210A. The packet time-stamps 402A–C are used to generate the statistics 404A–D corresponding to each of the sessions.

If reporting is performed solely on a per flow basis, it does not capture the overall performance of the session. Nor does it capture the performance from an application specific fashion. For example, an H.323 call is may be comprised of at three or more flows. For example, for a call from John to Jane, there might be two flows for audio and a third flow for control. Per flow monitoring alone could suggest that one flow for the call, e.g. John to Jane, is meeting the committed quality of service. But, nothing would connect that information with the fact that the other flow, Jane to John, is not.

Further, if there is billing taking place, then it is important that the billing be aggregated on a per session basis with meaningful service detail billing. For voice over IP telephony, that might be a charge per minute per leg. For HTTP, that might be a charge per megabyte. A service detail record can include a billing identifier, e.g. user name, calling card number, phone number, and/or some other identifier. The service detail record also can include the usage within the interval covered by the service detail record. For example, a service detail record for a voice over IP call might include the phone number and the usage, e.g. "650/555-1212, 5 legs, 3007 sec ttl", etc. For an Internet backbone provider, service detail records generated might be at the ISP level and measured in megabytes in a fixed interval, e.g. "ispl 300.7 MB".

Some statistics computed by embodiments of the invention include: flow-level statistics, start time, end time, time since last output, number of packets, number of bytes, average time between packets, moving average, latency, throughput, jitter, and/or other statistics. The jitter is the standard deviation of the latency and throughput. When appropriate, the statistics can be further subdivided between input and output information. Latency is an application specific computation in some embodiments of the invention. For example, with TCP packets, latency can be determined by looking at the time between sequential acknowledgements. In contrast, for a real-time protocol, the latency might be calculated as the difference between the end of communication in a control flow and the start of communication in a data flow.

E. Output Generation

Figure 5:
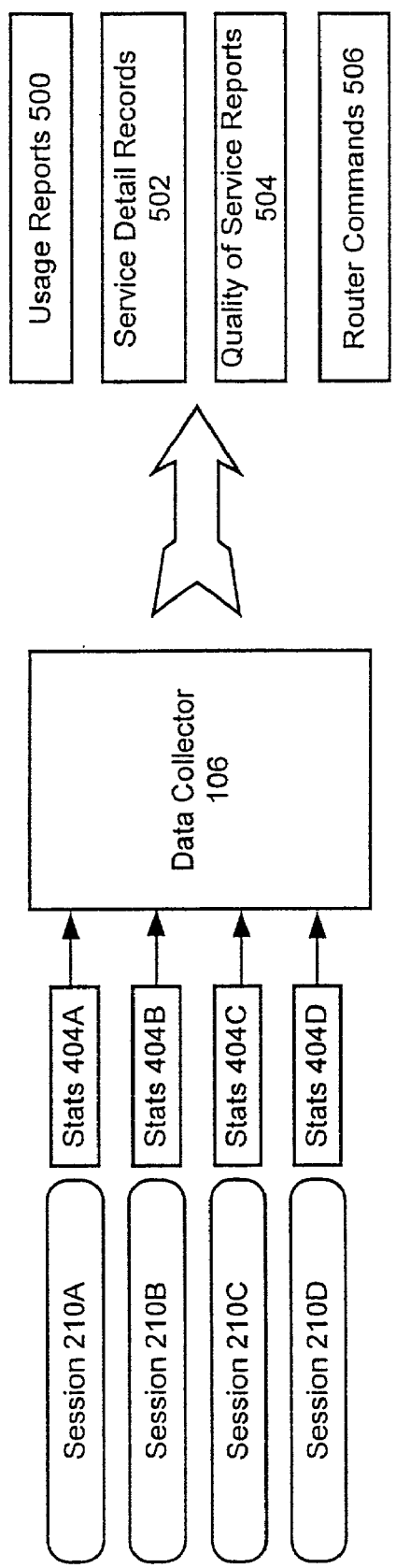
FIG. 5 illustrates information generated by some embodiments of the invention for from session information.

FIG. 5 illustrates information generated by some embodiments of the invention for from session information. As FIG. 5 shows, the generated statistics, e.g. the statistics 404A–D, for sessions can be provided to the data collector 106. The policy 114 can be used to define the output of the data collector 116.

Outputs include usage reports 500 that describe application usage in application specific terms, e.g. 700 minutes of voice over IP calls, maximum of 10 simultaneous calls, etc. Service detail records 502 are another output of the data collector 106. These could be output at application specific intervals, six seconds for voice over IP, every hour for web usage, etc. The service detail records 502 can be used for billing purposes and also to limit access if the paid for usage is exceeded.

For example if a user purchases twenty minutes of voice over IP calls, when she/he reaches that limit, systems monitoring the service detail records 502 can terminate the call, etc.

Another output can include quality of service reports 504. These may specify, on an application level, the performance for the session, as appropriate, this can be presented in application specific terms. For example, if a voice over IP call should have no more than a Z ms latency to avoid echo, the report might specify how many calls exceeded that latency and by how much.

Another output might include router commands 506 to control a router, e.g. to limit further usage or re-prioritize usage of bandwidth relative to performance and committed quality of service. For example, if RealAudio(TM) sessions consume too much bandwidth relative to the priority set in the policy 114, the router commands 506 could block the routing of RealAudio(TM), or reduce its priority further to allow higher priority sessions to proceed at the committed quality of service.

In some embodiments, aspects of the different reports are combined. For example, the service detail report 502 might include the quality of service of a voice over IP call and if the committed quality of service is not delivered, the usage charge might be waived.

F. Distributed Session Reconstruction

1. Description of the Problem

The foregoing discussion has focused on a setting in which all packets are visible to a single session reconstruction system. However, in many configurations it may not be possible, or desirable, to provide all packet data to a single point.

Figure 6:
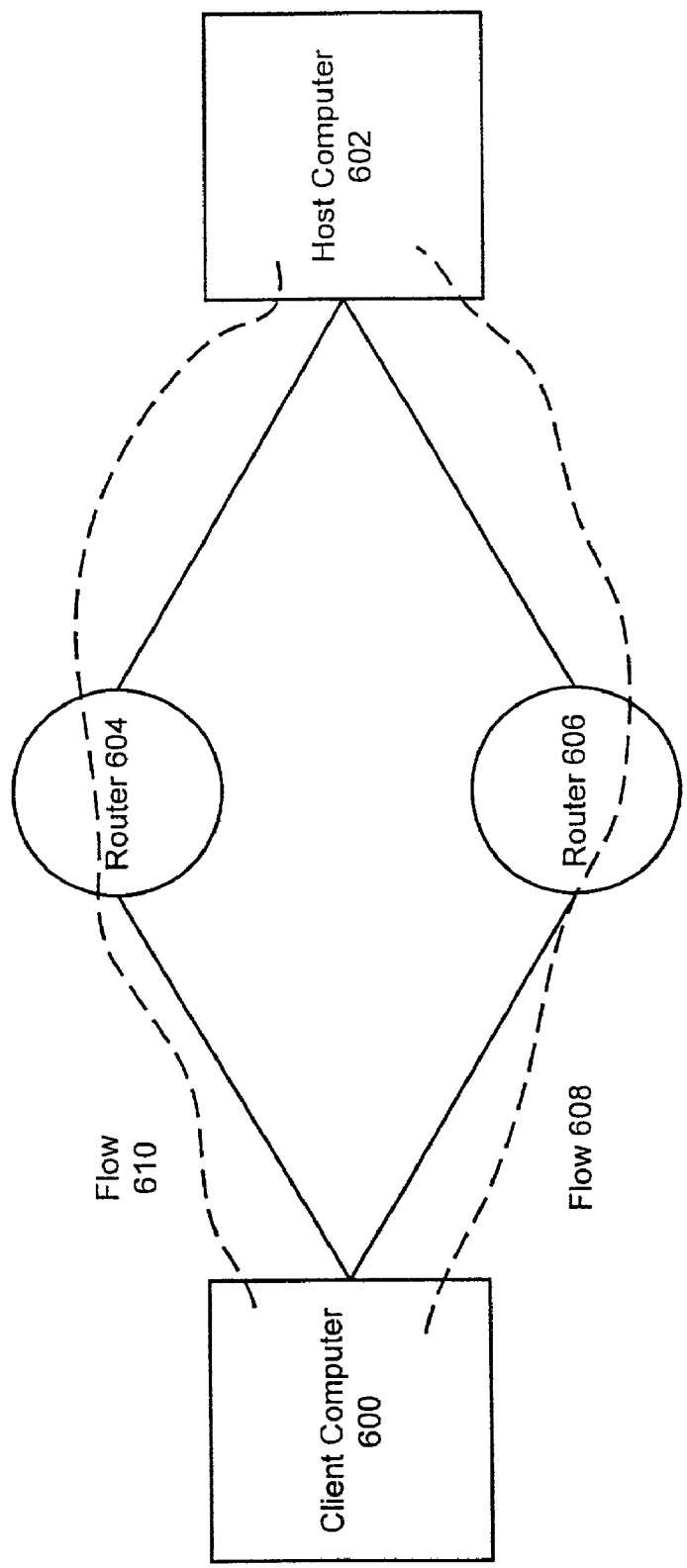
FIG. 6 illustrates a situation in which distributed session reconstruction may be desirable.

FIG. 6 illustrates a situation in which distributed session reconstruction may be desirable. A client computer 600 and a host computer 602 are coupled in communication over a packet switched network including two routers, the router 604 and the router 606. Two examples will be considered, one involving the file transfer protocol and the other involving asymmetric routing.

In the first example, the flows from a simple FTP session are shown as a dotted path between the client computer 600 and the host computer 602. Here, a flow 608 is the control flow for the FTP session and is established across the router 606. Meanwhile, the flow 610 is a transfer flow in the FTP session and is established across the router 604.

Assume, for the sake of argument, that the packets flowing through the router 606 are sent to a session reconstruction system of the type described above as the packet source 100a, but that packets flowing through the router 604 are provided to a different session reconstruction system. The session reconstruction system monitoring the packets from the router 606 will be able to detect the FTP session and the control flow 608. The other session reconstruction system, monitoring the packets from the router 604, may be able to detect the transfer flow 610, but may not be able to identify the protocol or the appropriate application session.

In the next example, the flow 608 and the flow 610 represent two halves of a single communication. This occurs when the traffic from the client computer 600 to the host computer 602 traverse a different set of network devices than packets sent in the other direction, e.g. asymmetric routing. Again, as in the example above, if the two routers are supplying their traffic data to different session reconstruction systems, it may not be possible to monitor even a single flow from one session reconstruction system.

In these instances, neither session reconstruction system would be able to provide a complete description of the session. As networks become more heavily meshed and redundant, situations like the one depicted in FIG. 6 are likely to occur more frequently.

2. Solution to the Distributed Case

Solutions to this problem could include providing all of the raw data to a single session reconstruction system. This approach does not scale well. As the number of packet sources increases, the bandwidth and computation power required for session reconstruction goes up. For example, consider a session reconstruction system coupled to an ATM switch, that system might be working at capacity. Adding packets from three or four additional ATM switches for analysis may not be a viable option computationally or in terms of bandwidth.

Figure 7:
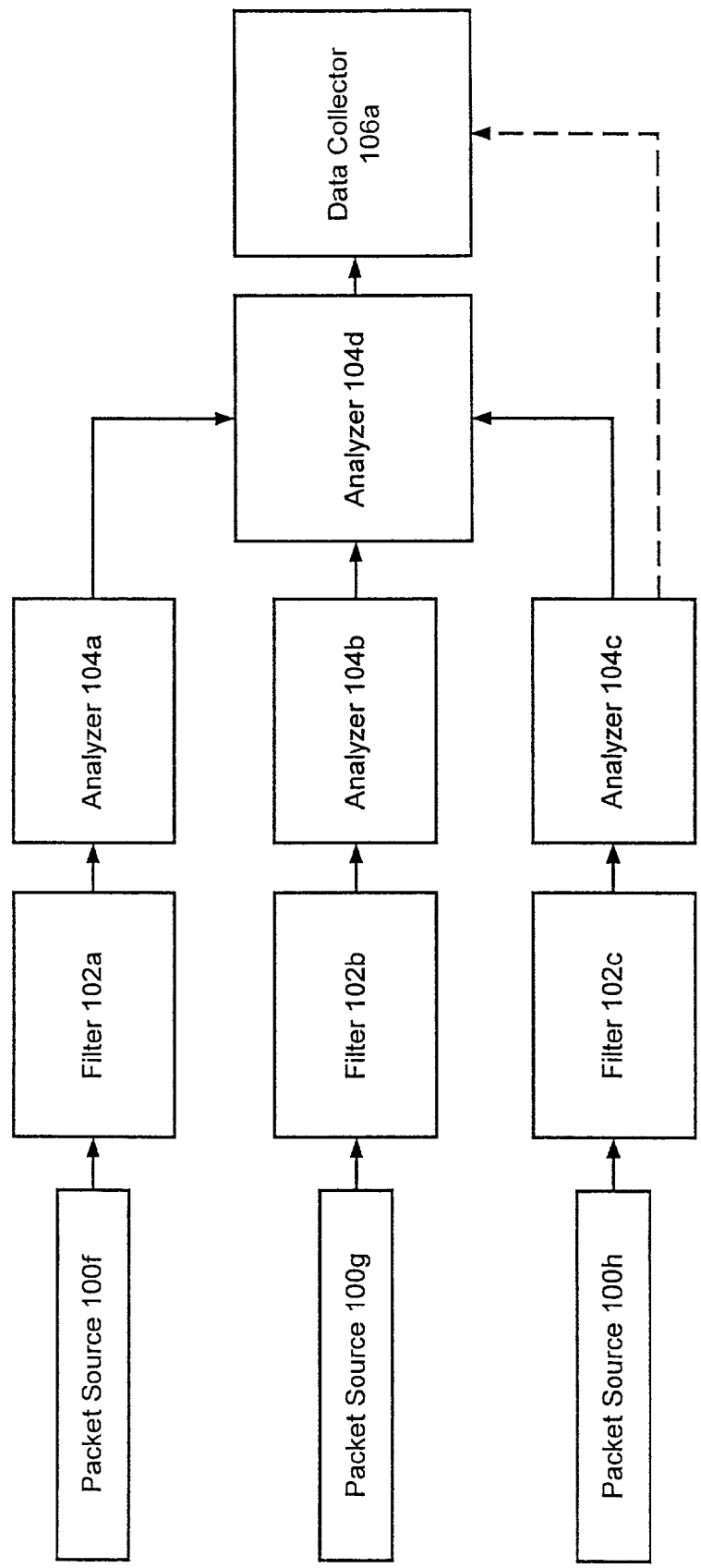
FIG. 7 illustrates a system including one embodiment of the invention configured to support distributed session reconstruction.

Accordingly, some embodiments of the invention operate in a semi-hierarchical fashion. This allows session reconstruction to be distributed over several systems of the type described above. FIG. 7 illustrates a system including one embodiment of the invention configured to support distributed session reconstruction. FIG. 7 does not show the policy 114, however such a policy can control the filters 102*a*–*c*, analyzers 104*a*–*d* and data collector 106*a*. Additionally, the policy 114 can have different rules for different modules, if appropriate. For example, filter 102*a* and filter 102*b* might have different rules in the policy 114 to filter out local traffic.

As seen in FIG. 7, the basic configuration of each session reconstruction system is according to the manner described above. A packet source (e.g. the packet source 100*f*) flows into a filter (e.g. the filter 102*a*) and then to an analyzer (e.g. the analyzer 104*a*). The difference lies in the disposition of results from the initial analysis—including unrecognized flows. In the system of FIG. 7, results from the analyzers 104*a*–*d* can be passed to other analyzers (e.g. the analyzer 104*d*). This approach can be further nested with the analyzer 104*d* coupled to other analyzers higher in the hierarchy, not shown. Additionally, when appropriate, data can be transferred directly from an analyzer (e.g. the analyzer 104*c*) to a data collector (e.g. the data collector 106*a*) as shown by the dotted line in FIG. 7. This would be appropriate if a session has been fully re-constructed by an analyzer (e.g. the analyzer 104*c*).

The messages between analyzer levels can now be considered in more detail. There are two basic cases to consider: when the analyzer (e.g. the analyzer 104*a*) has complete session information and when the analyzer does not have complete session information.

When a given analyzer (e.g. the analyzer 104*a*) can determine complete session information, the session data, together with statistics, can be sent to a higher level analyzer (e.g. the analyzer 104*d*) or directly to the data collector (e.g. the data collector 106*a*).

When it is not possible for a given analyzer (e.g. the analyzer 104*a*) to determine complete session information, there are a number of approaches for providing information to higher level analyzers in the hierarchy. Three primary approaches will be considered: packet forwarding, hints together with forwarded packets, hints together with summary of packets. It is possible to use combinations of these approaches in a single system. Additionally, other approaches can be used.

a. Packet Forwarding

In many respects, this is the simplest of the three approaches; however, it is also inefficient from a bandwidth perspective. In this approach, packets that can not be constructed into sessions are forwarded as raw packet data—together with time stamps—to higher level analyzers.

At the higher level analyzer, the raw packet data from the different lower level analyzers can be integrated and considered. In many instances, e.g. the example of FIG. 6, this will allow for session reconstruction. Thus, if the analyzer 104*a* was handling the data from the router 606 and the analyzer 104*b* was handling the data from the router 604, both analyzers would forward the raw packet data to the analyzer 104*d* which would now be able to recognize the entire FTP session.

b. Hints Plus Packet Forwarding

This approach reduces some of the computational complexity of the first approach, e.g. the need for the higher level analyzers to reprocess all packet data. In this approach, hints are extracted by the lower level session analyzer and provided to higher level analyzers. Additionally, as in the first approach, the raw packet data is forwarded—together with time stamps—to higher level analyzers.

Turning again to the example of FIG. 6. If the analyzer 104*a* is handling the data from the router 606, the application streamer might detect the request to establish a file transfer over certain ports within the control flow 608. This information can be provided to the higher level organizer as a hint. Additional, a second hint could be provided that identifies the packets being forwarded by the analyzer 104*a* as an FTP control flow. The hints reduce the amount of processing required by the higher level analyzer.

For example, the higher level analyzer could use the second hint to identify the forwarded packets as belonging to an FTP session and use the first hint to prime the application streamer to recognize the transfer flow packets when they are forwarded from another analyzer.

c. Hints Plus Summary of Packets

This approach is the most complex, but also the most bandwidth efficient. In this approach, as above, hints are generated at lower level analyzers. Additionally, incomplete data is aggregated into a summary whenever possible. The summary can include information from packet headers as well as attributes and metrics. Examples of data that would be included in summaries are: source address, destination address, source port, destination port, terms of service (TOS), protocol quality of service (QOS), number of packets, number of bytes, latency, etc.

Using this approach, the control flow 608 could be reduced to a summary together with a hint for recognizing the transfer flow 610. The transfer flow 610 might be reduced to a summary by another analyzer and the hint would allow a higher level analyzer to group the summary information about the transfer flow 610 as part of a single FTP session with the control flow 608 summary information.

In some instances, it may not be possible to summarize a group of packets. In that case, it may be necessary to forward the raw packet data. In some embodiments, small flows and/or packets are sent rather than generating a summary. This is efficient because the cost of sending a summary about a small packet or an extremely short flow may exceed the cost of re-transmitting the small packet or extremely short flow.

The different approaches are each backward compatible with the previous approaches. Thus, two hint methods can accept data in packet forwarding format, e.g. without hints.

Similarly, the hint plus summary method can also accept hints together with forward packets, e.g. without summaries.

3. Additional Configurations

Some additional configurations used by some embodiments of the invention should be discussed. If desired, the filter, e.g. the filter 102, can be omitted. Similarly, when arranging a hierarchy of distributed session reconstruction modules, different streams can traverse different components. For example, in FIG. 7, the analyzer 104c could be omitted in preference for allowing the packet source 100h to be analyzed first by the analyzer 104d. These variant arrangements can reduce hardware and software costs associated with using embodiments of the invention while also increasing the flexibility with which embodiments of the invention can be deployed.

G. Alternative Embodiments

In some embodiments, the filter 102, the analyzer 104, the flow manager 108, the application recognizer 110, the session streamer 112, the data collector 106, the policy 114, the application tests 206 and the application streamers 306 are included in hardware, software, and/or a combination of hardware and software.

In some embodiments, the filter 102, the analyzer 104, the flow manager 108, the application recognizer 110, the session streamer 112, the data collector 106, the policy 114, the application tests 206 and the application streamers 306 are included as one or more computer usable media such as CD-ROMs, floppy disks, and/or other media.

Some embodiments of the invention are included in an electromagnetic wave form. The electromagnetic wave form comprises information such as the flow manager 108, the application recognizer 110, the session streamer 112, the application tests 206, and/or the application streamers 306. For example, the application streamers 306 might include a database of application streamer data accessed over a network by the session streamer 112.

H. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A method for policy-based billing for a distributed network session, comprising:
    (a) receiving a plurality of packets at a plurality analyzers;
    (b) aggregating the plurality of packets;
    (c) analyzing the plurality of packets to identify a plurality of flows;
    (d) identifying a session associated with the flows;
    (e) identifying at least one application associated with the session;
    (f) reconstructing the session utilizing the identified application, the session reconstruction being carried out at a plurality of collaborating nodes;
    (g) identifying a user associated with the session;
    (h) determining a policy; and
    (i) billing the user the session in accordance with the policy;
        wherein the session reconstruction is performed at a first analyzer, and
        upon a successful session reconstruction on the first analyzer, a first message is sent to at least one second analyzer separate from the first analyzer, the first message corresponding to session data, and
        upon an unsuccessful session reconstruction on the first analyzer, one or more messages is sent to the second analyzer, the one or more messages including unrecognized data.

2. The method as recited in claim 1, and further comprising filtering the packets for removing packets unrelated to the session.

3. The method as recited in claim 1, and further comprising identifying application events associated with the session based on the policy.

4. The method as recited in claim 3, and further comprising assigning a significance to the application events based on the policy.

5. The method as recited in claim 3, wherein the user is billed for the session utilizing the application events in accordance with the policy.

6. The method as recited in claim 3, and further comprising determining billing information for the session using the application events in accordance with the policy.

7. The method as recited in claim 6, and further comprising outputting a report including the billing information in accordance with the policy.

8. The method as recited in claim 1, and further comprising restricting tasks of the user in accordance with the policy.

9. The method as recited in claim 8, wherein an amount of bandwidth is restricted in accordance with the policy.

10. The method as recited in claim 1, wherein the policy includes a series of packet capture language expressions and output selectors.

11. The method as recited in claim 1, wherein a first flow associated with a first application flows through a first one of the nodes.

12. The method as recited in claim 11, wherein a second flow associated with the first application flows through a second one of the nodes.

13. The method as recited in claim 1, wherein each of the collaborating nodes includes a packet source and a first hierarchical network analyzer.

14. The method as recited in claim 13, wherein each of the collaborating nodes further includes a filter coupled between the packet source and the first hierarchical network analyzer.

15. The method as recited in claim 13, wherein the first hierarchical network analyzers of each of the nodes feed information to a second hierarchical network analyzer.

16. The method as recited in claim 15, wherein the information is used by the second hierarchical network analyzer to reconstruct the session utilizing the identified application.

17. The method as recited in claim 15, wherein the information involves packet forwarding.

18. The method as recited in claim 15, wherein the information involves hints and packet forwarding, the hints being generated by a lower level session analyzer and provided to the higher level analyzer to facilitate the reconstruction of the session.

19. The method as recited in claim 15, wherein the information involves hints and a summary of packets, the hints being generated by a lower level session analyzer and provided to a higher level analyzer to facilitate the reconstruction of the session.

20. The method as recited in claim 1, wherein the nodes each include a router.

21. A computer program product embodied on a computer readable medium, which when executed by a computer causes the computer to perform a method for policy-based billing for a distributed network session, comprising:

(a) computer code for receiving a plurality of packets at a plurality of analyzers;
(b) computer code for aggregating the plurality of packets;
(c) computer code for analyzing the plurality of packets to identify a plurality of flows;
(d) computer code for identifying a session associated with the flows;
(e) computer code for identifying at least one application associated with the session;
(f) computer code for reconstructing the session utilizing the identified application, the session reconstruction being carried out at a plurality of collaborating nodes;
(g) computer code for identifying a user associated with the session;
(h) computer code for determining a policy; and
(i) computer code for billing the user for the session in accordance with the policy;
wherein the session reconstruction is performed at a first analyzer, and
upon a successful session reconstruction on the first analyzer, a first message is sent to at least one second analyzer separate from the first analyzer, the first message corresponding to session data, and
upon an unsuccessful session reconstruction on the first analyzer, one or more messages is sent to the second analyzer, the one or more messages including unrecognized data.

22. The computer program product as recited in claim 21, and further comprising computer code for filtering the packets for removing packets unrelated to the session.

23. The computer program product as recited in claim 21, and further comprising computer code for identifying application events associated with the session based on the policy.

24. The computer program product as recited in claim 23, and further comprising computer code for assigning a significance to the application events based on the policy.

25. The computer program product as recited in claim 23, wherein the user is billed for the session utilizing the application events in accordance with the policy.

26. The computer program product as recited in claim 23, and further comprising computer code for determining billing information for the session using the application events in accordance with the policy.

27. The computer program product as recited in claim 26, and further comprising computer code for outputting a report including the billing information in accordance with the policy.

28. The computer program product as recited in claim 21, and further comprising computer code for restricting tasks of the user in accordance with the policy.

29. The computer program product as recited in claim 28, wherein an amount of bandwidth is restricted in accordance with the policy.

30. The computer program product as recited in claim 21, wherein the policy includes a series of packet capture language expressions and output selectors.

31. A method for policy-based billing for a distributed network session, comprising:
(a) receiving a plurality of packets at a plurality of analyzers;
(b) aggregating the plurality of packets;
(c) analyzing the plurality of packets to identify at least a first flow;
(d) identifying a session associated with the first flow;
(e) identifying additional flows in the plurality of packets associated with the session;
(f) filtering the packets for removing packets unrelated to the session;
(g) identifying at least one application associated with the session;
(h) reconstructing the session utilizing the identified application, the session reconstruction being carried out as a plurality of collaborating nodes;
(i) identifying a user associated with the session;
(j) identifying a policy;
(k) gathering application events associated with the session based on the policy;
(l) assigning a significance to the application events based on the policy;
(m) determining billing information for the session using the application events in accordance with the policy;
(n) outputting a report including the billing information in accordance with the policy;
(o) restricting tasks of the user in accordance with the policy; and
(p) executing actions in response to the application events in accordance with the policy;
wherein the session reconstruction is performed at a first analyzer, and
upon a successful session reconstruction on the first analyzer, a first message is sent to at least one second analyzer separate from the first analyzer, the first message corresponding to session data, and
upon an unsuccessful session reconstruction on the first analyzer, one or more messages is sent to the second analyzer, the one or more messages including unrecognized data.

* * * * *